United States Patent [19]

Feth

[11] Patent Number: 4,711,525

[45] Date of Patent: Dec. 8, 1987

[54] POLARIZING OPTICAL FIBER WITH ABSORBING JACKET

[75] Inventor: John R. Feth, Topanga, Calif.

[73] Assignee: Litton Systems, Inc., Beverly Hills, Calif.

[21] Appl. No.: 731,692

[22] Filed: May 8, 1985

[51] Int. Cl.⁴ .............................................. G02B 6/22
[52] U.S. Cl. ................................................. 350/96.33
[58] Field of Search ............... 350/96.29, 96.30, 96.31, 350/96.32, 96.33, 96.34

[56] References Cited

U.S. PATENT DOCUMENTS

| | | | |
|---|---|---|---|
| 4,206,967 | 6/1980 | Onoda et al. | 350/96.33 |
| 4,298,245 | 11/1981 | Aulich et al. | 350/96.29 |
| 4,372,646 | 2/1983 | Strahan et al. | 350/96.31 |
| 4,465,336 | 8/1984 | Huber et al. | 350/96.30 |
| 4,494,969 | 1/1985 | Bhagavatula | 65/3.12 |
| 4,529,426 | 7/1985 | Pleibel et al. | 65/3.11 |
| 4,549,781 | 10/1985 | Bhagavatula et al. | 350/96.33 X |
| 4,552,578 | 11/1985 | Anderson | 65/29 |
| 4,557,742 | 12/1985 | Thigpen | 65/2 |
| 4,561,871 | 12/1985 | Berkey | 65/3.11 |
| 4,575,187 | 3/1986 | Howard et al. | 350/96.33 |
| 4,589,728 | 5/1986 | Dyott et al. | 350/96.30 |
| 4,603,941 | 8/1986 | Fujii et al. | 350/96.15 |
| 4,603,943 | 8/1986 | Okoshi | 350/96.33 |
| 4,615,583 | 10/1986 | Tsuno et al. | 350/96.33 |

OTHER PUBLICATIONS

Fujii, Y., "Optical Fibers with Very Fine Layered Dielectrics", *Applied Optics*, vol. 25, No. 7, pp. 1061–1065 (Apr. 1, 1986).

Okoshi, T., "Single-Polarization Single-Mode Optical Fibers", *IEEE J. of Quantum Electronics*, vol. QE-17, No. 6, pp. 879–883 (Jun. 1981).

Tateda et al., "Optical Wave Propagation in Form-Birefringent Media and Waveguides", IEEE, pp. 402–407 (1983).

Primary Examiner—Eugene R. LaRoche
Assistant Examiner—James C. Lee
Attorney, Agent, or Firm—Lynn & Lynn

[57] ABSTRACT

An optical fiber has an absorbing jacket to absorb cladding modes in a very short distance along the optical fiber to prevent cladding modes from having a significant affect upon signal quality. The absorbing jacket cooperates with a form birefringent polarizing fiber, which radiates light of one polarization out of the core into the cladding, to provide light of a single polarization suitable for use in fiber optic sensing systems and communications systems whose operational characteristics are polarization dependent.

4 Claims, 7 Drawing Figures

POLARIZING OPTICAL FIBER WITH ABSORBING JACKET

CROSS-REFERENCE TO RELATED APPLICATION

This application is related to U.S. patent application Ser. No. 659,804, filed Oct. 11, 1984 by John R. Feth et al., assignees to Litton Systems, Inc., assignee of the present application.

BACKGROUND OF THE INVENTION

This invention relates generally to fiber optic waveguides and particularly to an absorbing jacket for use with fiber optic waveguides to remove cladding modes therefrom. Still more particularly, this invention relates an absorbing jacket for use with form birefringent optical fibers for propagating a single mode of optical energy in a defined polarization.

It is well-known that optical fibers used for guiding electromagnetic energy in the optical region of the electromagnetic spectrum have a central core that is surrounded by an outer cladding. The index of refraction of the cladding is less than that of the core. Therefore, light propagating in the core sees a dielectric interface at the core-cladding boundary where the refractive index outside the core is less than the core index. Light readily propagates from a material having a low index of refraction to a material having a higher index of refraction. However, when light propagating in a first dielectric impinges upon a dielectric interface where the refractive index decreases as the light crosses the interface, a significant portion of the light may be reflected at the interface back into first dielectric in a classical ray optics model, the internal reflection will be 100% if the angle of incidence is greater than a certain critical angle, which depends upon the ratio of the refractive indices of the materials on the two sides of the interface. The core of an optical fiber is capable of guiding an optical signal because the diameter of the core is so small that light impinges upon the core/cladding interface at angles of incidence that are greater than the critical angle for internal reflection. Therefore, essentially all of a light beam guided by the fiber is in the core; but the boundary conditions at the core/cladding interface require the existence of an exponentially decaying evanescent field that penetrates into the cladding. This evanescent field is correlated with the light guided by the core.

However, it is possible or some small portion of the light to be scattered out of the core into the cladding. Light that propagates in the cladding is generally called a "cladding mode." Cladding modes will degrade the signal guided by core because detectors cannot distinguish the signal from cladding modes. Therefore, cladding modes are undesirable in fiber optic systems, such as rotation sensors and interferometric sensors.

Cladding modes are distinct from the evanescent field of a wave guided by the core and are uncorrelated with information contained in the light guided by the core. Since light easily propagates from a region of lower index of refraction to a region of higher index of refraction, the cladding modes may couple back into the core and remain uncorrelated with the information. If light from the fiber is incident upon a detector both the light carried in the cladding and the portion of the cladding modes that has coupled back into the core are sources of noise, which tends to degrade the integrity of information contained in an optical signal guided by the core.

Conventional single mode and multimode optical fibers are jacketed with a relatively soft plastic material to protect the intrinsically fragile glass fiber from fractures caused by localized applied mechanical stresses. The plastic coating is generally transparent or translucent and has a refractive index greater than the refractive index of the cladding. Therefore, in conventional optical fibers, the cladding modes will eventually radiate into the jacket. However, effective stripping of the cladding modes ordinarily requires tens of meters of fiber after creation of the cladding mode. Excitation of cladding modes is ordinarily to be avoided in conventional optical fibers because the cladding mode represents a loss of signal intensity and is a source of noise in many fiber optic systems and devices.

It is known in the art that encasing the fibers of a bundle in an absorbing glass at a face plate connecting the ends of the fibers to another bundle will alleviate the problem of cross-talk between the fibers.

When materials with different refractive indices are stratified optically and periodically, optical wave behavior is different from that in a uniform medium. In particular, when the thickness of each layer is sufficiently small compared with the light wavelength and the number of layers is sufficiently large, the compound medium is birefringent. Form birefringence results when there is an ordered arrangement of optically isotropic materials (layers) whose size is large compared with the molecules of the materials, but small when compared with the optical wavelength propagating in the fiber. Fiber optic field devices using form birefringent fiber are useful, for example, in constructing gyroscopes, sensors, frequency shifters and communications systems.

Problems arise in using ordinary fibers to form the above listed passive and active components. Strictly speaking, an ordinary axially symmetrical single mode fiber is a "two-mode" fiber because such fibers will propagate two orthogonally polarized $He_{11}$ modes. Each polarization has a propagation constant, but an ordinary fiber has propagation constants so nearly equal that degeneracy results. Propagation of two orthogonal polarizations results from the instability of the polarization state of a propagated mode when geometrical perturbations exist in the fiber. Polarization instability degrades the performance of optical fibers in some applications of single-mode fibers in communications and sensing systems.

Previous attempts to provide polarization stability have usually employed one of several methods of maximizing the differences between the propagation constants of the two polarization modes. Elliptical core fibers provide an asymmetrical propagation constant distribution to provide the required difference in propagation constant. Application of an asymmetrical stress distribution by bending a fiber will achieve the same result.

Elliptical core fibers are not practical because producing the desired birefringence in this manner increases the transmission loss to unacceptably high values and because of attendant difficulties in splicing such fibers together and in connecting them to other devices. Stress induced birefringence is subject to relaxation as the fiber optic material flows over extended time periods to relieve the stress. Stressing a fiber to induce birefringence also often results in a fracture of the fiber in the fabrication of devices.

SUMMARY OF THE INVENTION

The present invention provides an absorbing jacket for an optical fiber to absorb cladding modes in a very short distance along the optical fiber, thereby preventing cladding modes from having a significant affect upon signal quality. Since the cladding modes are removed from the fiber in a very short distance, there is little opportunity for uncorrelated optical energy to couple from the cladding back into the core.

The present invention specifically provides an absorbing jacket for use with a form birefringent polarizing fiber suitable for use in fiber optic rotation sensing systems and in communications systems whose operational characteristics are polarization dependent. For example, the form birefringent polarizing fiber with the absorbing jacket of the invention applied thereto is suitable for forming a polarizer, for forming the sensing loop in an optical rotation sensor and for forming an interferometric sensor. The invention also includes a method for applying the absorbing jacket to the form birefringent polarizing fiber such that undesired polarizations propagate out of the core and are almost completely absorbed within a distance of a few centimeters along the fiber.

The form birefringent polarizing fiber is formed by first forming a plurality motifs of alternating layers of materials having different refractive indices. The motif of a periodic structure is the smallest dimension that preserves the proportions of its constituents. It is well-known in the art that a structure comprising multiple layers of alternating refractive index has different characteristic refractive indices for electromagnetic waves polarized perpendicular and parallel to the layers. The motifs are stacked and heated to form an essentially monolithic block having many alternating layers. The block may then be stretched, for example, by drawing it through a succession of dies to reduce the dimensions to values suitable for use as the core of a preform that may be drawn into an optical fiber. Before drawing, the block may be ground to form a cylinder in order to produce a core having a circular cross section. A cladding having a refractive index preferably greater than or equal to one of the core refractive indices and less than the other core index may be added around the core by any of several techniques, such as reactive deposition of $SiO_2$ from a gaseous mixture.

The polarizing fiber used with the absorbing jacket of the invention employs alternating layers having dimensions and refractive indices such that the difference between the two refractive indices of the composite structure is about 0.004. This difference in refractive indices permits the addition of a cladding having a cladding refractive index that is equal to or slightly greater than one of the core indices.

The resulting fiber will propagate only waves of a predetermined polarization because light having a polarization in one preferred direction will remain in the fiber due to internal reflections at the core-cladding interface while all other polarizations are radiated. Light of the undesired polarization introduced into the polarizing fiber will be radiated from the core into the cladding in a very short distance and absorbed by the jacket.

DESCRIPTION OF THE PREFERRED EMBODIMENT

Figure 1:
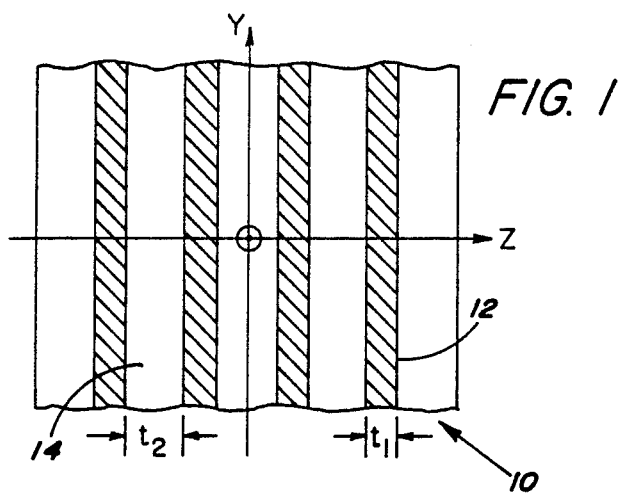
FIG. 1 is a cross-sectional view representing a periodic multi-layer dielectric structure.

Referring to FIG. 1, a periodic multi-layer dielectric structure 10 comprises a plurality of alternating layers 12, 14 having different refractive indices. The layers 12 and 14 have thicknesses $t_1$ and $t_2$, respectively, that are less than the wavelength of light to be propagated therethrough. In an optical rotation sensing system (not shown) the optical wavelength is typically about 820 nm.

The refractive index of the multilayer structure 10 depends upon the polarization state of the propagating light. For simplicity, it is assumed that a plane wave linearly polarized with its electric field in the z-direction propagates along the x-axis, which points out of the plane of FIG. 1. According to well known boundary conditions on electromagnetic waves at dielectric interfaces, the normal component of the electric displacement vector, D, must be continuous such that $$D_{1z}=D_{2z}=D, \tag{1}$$

and, therefore, $$\epsilon_1 E_1 = \epsilon_2 E_2 = D, \tag{2}$$

where $\epsilon_1$ and $\epsilon_2$ are the dielectric constants of the two materials.

The average electric field over one period of the layered structure 10 is $$<E> = (t_1 D/\epsilon_1 + t_2 D/\epsilon_2)(t_1+t_2)^{-1} \tag{3}$$

The effective dielectric constant $\epsilon_z$ for a wave polarized in the z-direction is therefore $$\epsilon_z = D/<E> \tag{4}$$

$$\epsilon_z = [(t_1+t_2)\epsilon_1\epsilon_2][\epsilon_2 t_1 + \epsilon_1 t_2]^{-1} \tag{5}$$

For convenience of notation, fractional thicknesses $f_1$ and $f_2$ are defined as $$f_1 = t_1/(t_1+t_2), \tag{6}$$

and $$f_2 = t_2/(t_1+t_2) \tag{7}$$

Using Equations (6) and (7) in Equation (5) gives the result that $$\epsilon_z = (\epsilon_1 \epsilon_2)(\epsilon_2 f_1 + \epsilon_1 f_2)^{-1} \tag{8}$$

The tangential component of a wave polarized in the y-direction must be continuous so that $$E_{1y} = E_{2y} = E \tag{9}$$

The average value of the electric displacement over one period is $$<D> = (t_1 \epsilon_1 E + t_2 \epsilon_2 E)(t_1 + t_2)^{-1} \tag{10}$$

From the definition of the electric displacement, $$\epsilon_y = <D>/E \tag{11}$$

which becomes $$\epsilon_y = (t_1 \epsilon_1 + t_2 \epsilon_2)(t_1 + t_2)^{-1} \tag{12}$$

In terms of the fractional thicknesses $f_1$ and $f_2$, the dielectric constant $\epsilon_y$ for a wave polarized in the y-direction is given by $$\epsilon_y = \epsilon_1 f_1 + \epsilon_2 f_2 \tag{13}$$

Equations (8) and (13) may be used to calculate the refractive indices in the z- and y-directions. From the definition of the refractive index, $$n_z = [\epsilon_z/\epsilon_0]^{\frac{1}{2}}, \tag{14}$$

$$n_1 = [\epsilon_1/\epsilon_0]^{\frac{1}{2}}, \tag{15}$$

and $$n_2 = [\epsilon_2/\epsilon_0]^{\frac{1}{2}}, \tag{16}$$

where $\epsilon_0$ is the permittivity of free space.

Using Equations (14), (15) and (16) in Equations (8) and (13) gives $$n_z = n_1 n_2 [n_2^2 f_1 n_1^2 f_2]^{-\frac{1}{2}}, \text{ and} \tag{17}$$

$$n_y = [n_1^2 f_1 + n_2^2 f_2]^{\frac{1}{2}}. \tag{18}$$

Figure 4:
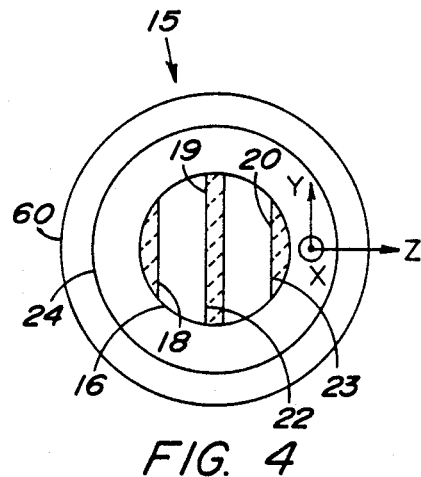
FIG. 4 is a simplified cross-sectional view of a form birefringent polarizing fiber according to the invention.

Equations (17) and (18) show that birefringent properties can be synthesized by properly choosing materials for the layers 12 and 14 to have particular refractive indices and by properly choosing the fractional thicknesses $f_1$ and $f_2$. The birefringence of the layered structure 10 is called "form birefringence" since the effective dielectric constant is one value for all polarizations parallel to the layers 12 and 14 and another value for polarizations normal to the layers 12 and 14. As shown in FIG. 4, the refractive index for polarization along the z-axis is less than the refractive index for polarization along the y-axis. In mathematical notation, the relation between the refractive indices is $$n_y > n_{clad} \geq n_z. \tag{19}$$

Figure 2:
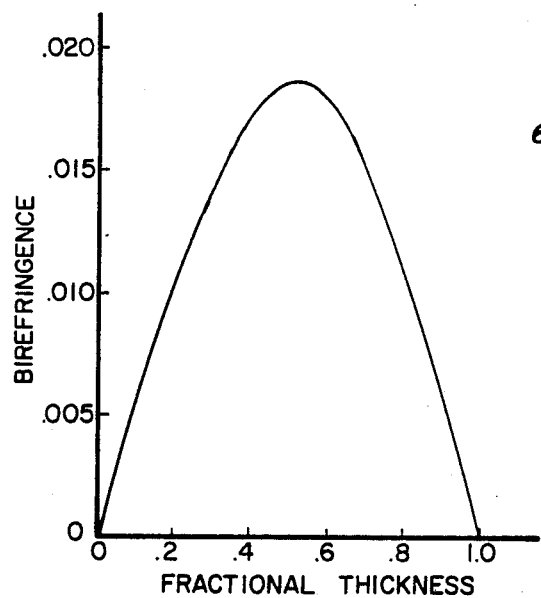
FIG. 2 is a graphical representation of the birefringence of a multi-layer stack of alternating layers of two dielectric materials.

FIG. 2 graphically displays an example of the birefringence of a multilayer structure. FIG. 2 illustrates the difference $\Delta n = n_y - n_z$ of the refractive indices for ordinary and extraordinary waves as a function of the fractional thickness. The graph of FIG. 2 represents the form birefringence obtained when the layer 12 is formed of $Al_2O_3$ and the layer 14 is formed of $AlF_3$.

Referring to FIG. 4, a form birefringent polarizing fiber 15 according to the invention includes a core 16 comprised of layers 18–20 of a first material and layers 22, 23 of a second material having an index of refraction different from the first material. The fiber 15 includes a cladding 24 having a refractive index $n_c$. The core 16 may comprise many layers of the two materials, but only the five layers 18–20 and 22, 23 are shown for convenience of illustration and explanation.

It has been found that the selective guiding of one state and radiation of all others may be realized by a form birefringent core having $\Delta n = 0.004$. With $\Delta n$ having the desired value of 0.004, the refractive index $n_c$ of the cladding 24 can be made approximately equal to or slightly greater than $n_z$. With the refractive indices chosen as described herein, the z-component of the polarization of all light input to the fiber will be radiated into the cladding 24 while the y-component of the polarization will be propagated within the core 16 and preserved without cross-talk with the other polarization.

Figure 5:
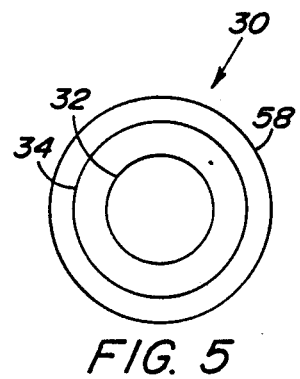
FIG. 5 is a cross-sectional view of an ordinary optical fiber having a core and a cladding.

An ordinary optical fiber 30, shown in FIG. 5, has a core 32 formed of a single material having a refractive index greater than the refractive index of the cladding 34. The diameter of the core 32 is sufficiently small that all light propagating therein strikes the interface between the core 32 and the cladding 34 at an angle greater than the critical angle. Therefore, almost all of the optical energy propagating within the fiber 30 is in the core 32.

DESIGN AND FABRICATION OF A JACKETED POLARIZING FIBER

I. Design

The present invention employs the construction of a form birefringent fiber in which the birefringence is generated by juxtaposing materials with different bulk refractive indices in appropriate proportions that are related to one another by equations (17) and (18) above.

Because of the unwieldy dimensions of an optical fiber, the gross dimension must be suppressed until the final step of fabrication. This is conveniently accomplished by constructing a preform in which the spatial ratios, angular relationships, and refractive indices are the same as in the finished fiber produced by a succession of drawing or stretching steps well-known in the art. Preservation of these three properties in the drawing process allows the fabrication of conventional single and multimode fibers. Considering this, it is possible to define a core geometry and scale it to workable size.

Figure 3:
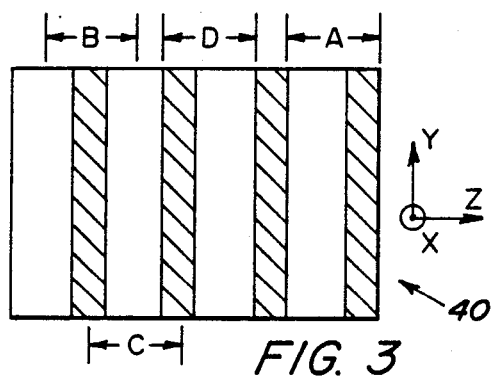
FIG. 3 is a cross-sectional view of a periodic multi-layer dielectric structure formed of alternating layers of two materials having different refractive indices, illustrating the concept and placements of a motif.

For form birefringence the scale of the finished fiber must present refractive index periodicities in the core of less than the guided wavelength. The structural unit used to quantify this requirement is represented by the term "motif". The motif of a periodic structure is the smallest dimension that preserves the proportions of its constituents. The motif of a form birefringent core under discussion is then the thickness of one $SiO_2$ layer plus the thickness of one $GeO_2$ layer. The dimensions labeled A, B, C and D of FIG. 3 illustrate various placements of a motif. The length of the structure of FIG. 3 is four motifs along the z axis. As there is no periodicity along the y or x axes, $n_z$ is the appropriate index of refraction to use in determining the largest motif size, M, that would exhibit form birefringence. As was noted above, form birefringence begins to be exhibited when the motif size M is equal to or less than the optical wavelength in the material under discussion. This is called the threshold of form birefringence. Thus the threshold of form brefringence is $$M < \lambda_0/n_z = 8200 \text{ Å}/1.4781 = 5548 \text{ Å}, \qquad (20)$$

where $\lambda_0$ is the optical wavelength in vacuum. The threshold of form birefringence occurs with a motif of less than 5548 Å; therefore $$M < 5548 \text{ Å} = \lambda_z = 5548 \text{ Å} \qquad (21)$$

To ensure form birefringence, M should be significantly less than the threshold, for example, $$M = \lambda_z/8 \qquad (22)$$

$$M = 693 \text{ Å} \qquad (23)$$

For a final core diameter of $C = 2.8\mu$, which is equivalent to 28000 Å, the core 16 then contains $C/M = 28000 \text{ Å}/693 \text{ Å} \approx 40$ motifs.

Figure 6:
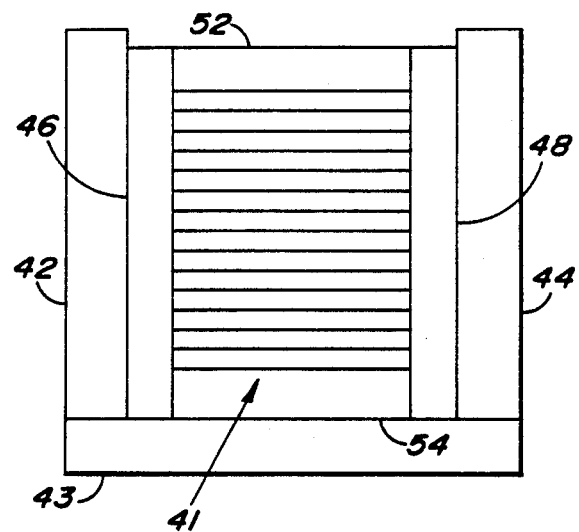
FIG. 6 is an elevation view showing fused silica casings positioned between a stack of motifs and a plurality of graphite blocks.

FIG. 6 represents a stack of 40 motifs retained between a plurality of graphite blocks 42, 43, 44. It is to be understood that the stack must be supported on five sides. By setting the preform motif to 0.5 millimeters and fabricating each of the required 40 motifs as a thin rectangular plate with dimensions of $0.5 \times 20 \times 50$ millimeters, the complete core can be assembled as a rectangular solid with dimensions of $20 \times 20 \times 50$ millimeters. In order to achieve the desired $\Delta n = 0.004$, the $SiO_2$ component of the motif may have a fractional thickness, $f_1$ of 0.800; and the $GeO_2$ component will have a fractional thickness $f_2$ of 0.200. Therefore the thickness of the $SiO_2$ layer is $$f_1(M) = (0.800)(0.5 \text{ mm}) = 400\mu. \qquad (24)$$

The $GeO_2$ component of the motif will have a thickness of $$f_2(M) = (0.200)(0.5 \text{ mm}) = 100\mu. \qquad (25)$$

The volume of a core so constructed to have the above-listed dimensions is $(20 \text{ mm})(20 \text{ mm})(50 \text{ mm}) = 20000 \text{ mm}^3$, which is conserved during the drawing process. The length, L, of finished fiber having a square cross-section of $2.8\mu$ per side can be calculated as $$(2.8\mu)(2.8\mu)(L) = 20000 \text{ mm}^3, \qquad (26)$$

which gives the result that $$L = 2551 \text{ km}. \qquad (27)$$

With about 2500 kilometers of a well defined fiber available from a single preform, prototypical instrument development and entire production runs of instruments can share the same fiber.

Well established optical fabrication techniques can be used to fabricate the $SiO_2$ plates from pure bulk $SiO_2$. The $GeO_2$ component, however, may be too thick for formation by vapor deposition of pure Ge and subsequently oxidizing it to $GeO_2$. Formation of a layer of $GeO_2$ on the Ge surface will produce a glassy layer that will hinder the diffusion of oxygen into deeper portions of the Ge layer. The $GeO_2$ layer may be satisfactorily formed by a sputtering process. For example an RF magnetron sputtering system may be used to directly form a layer of $GeO_2$ that is $50\mu$ thick will be deposited on each side of the $SiO_2$ substrate to form the desired fractional thicknesses. The 40 motifs may then be stacked and supported on 5 sides by graphite blocks as shown in FIG. 6. The entire assembly is placed in a furnace and heated to the softening point of $GeO_2$ and then slowly cooled to room temperature. The graphite blocks are then removed (graphite is one of the few materials to which molten glasses will not adhere), and the fused core is removed.

From this point, the remaining steps in the fabrication of the fiber preform comprise applying a suitable thickness of $SiO_2$ cladding while moving the preform aspect ratio (length of preform/diameter of preform) toward a typical 5:1 ratio exhibited during the draw to finished fiber. If all the cladding necessary for the complete fiber were added in proportion to the fused core dimensions, the preform would be almost 60 cm in diameter but only 50 mm thick, and consequently impossible to draw.

Figure 7:
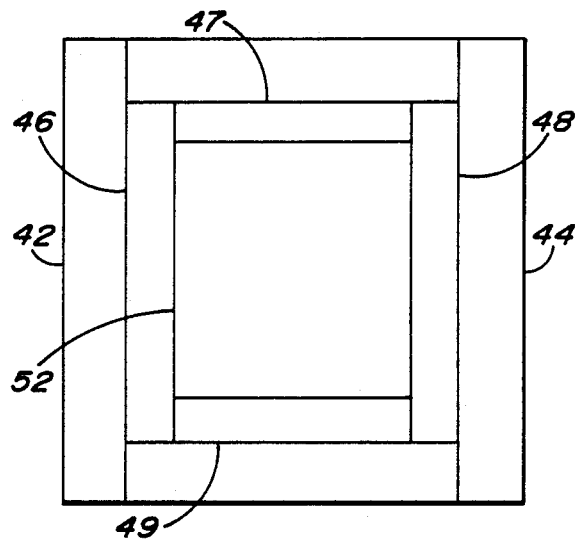
FIG. 7 is a plan view of the structure of FIG. 6.

Therefore, the cladding 24 should be added after the stack 41 has been reduced to dimensions smaller than the dimensions given above. During the process of reducing the dimensions of the stack 41, it should be protected from chemical contamination and physical damage. Enough material should be provided so that the furnace temperature and draw rate may be adjusted to yield accurate and consistent core dimensions. In order to protect the stack 41 from physical damage and chemical contamination from the graphite blocks 42, 43 and 44, the stack 41 of forty motifs which will form the core 16 may be enclosed within four fused silica casings 46–49 as shown in FIGS. 7 and 8. In order to provide adequate material for temperature and draw rate adjustments, a pair of fused silica plugs 52 and 54 are added at the ends of the core. The entire assembly of the stack 41 of motifs 40, the graphite blocks and the fused silica pieces are assembled as shown in FIGS. 6 and 7 prior to fusing. The probable casing plate dimensions may add approximately 10 mm to the cross section of the motif. Two of the casing plates may have dimensions of about 20 mm × 5 mm × 50 mm; and the other two casing plates may preferably have dimensions of about 30 mm × 5 mm × 50 mm. The plugs 52, 54 would match the cross section of the assembly of FIG. 6 and may preferably be about 30 mm × 30 mm × 50 mm. The entire assembly of the stack, the casings and the plugs is then heated while confined between the graphite blocks to form a monolith, which is then drawn down to have a cross section of approximately 3 mm × 3 mm. The fused silica casing is then ground off as the core 16 is made cylindrical, preferably by a centerless grinding technique well known in the art.

The cladding 24 may then be added to the core 16 by any one of several methods well known in the art of forming optical fibers, such as by fusing bulk $SiO_2$/$GeO_2$ onto the core, collapsing $SiO_2$/$GeO_2$ tubing onto the core, or by reactive deposition of $SiO_2$/$GeO_2$ from a gaseous mixture as is done in the OVD method of fiber manufacture.

To simplify this discussion, the core 16 has been described as being rectangular in cross section. An advantage of the rectangular shape includes efficient butt coupling to diode coherent light sources and integrated optic circuits. However, there may be significant loss penalties with a rectangular cross section. The fused core may be centerless ground to a cylindrical shape prior to application of the cladding if a circular cross section is most desirable.

The cladding must be formed to have an index of refraction greater than the refractive index of $SiO_2$. $SiCl_4$ and $GeCl_4$ both exist as vapors that may be oxidized to a mixture of $SiO_2$ and $GeO_2$ by a methane/oxygen flame. The refractive index of the resulting mixture depends upon its molar composition. Therefore control of the flow rates of the $SiCl_4$ and the $GeCl_4$, permits the deposition of a soot consisting of 82.18 mol % $SiO_2$ and 17.72 mol % $GeO_2$ on the core to form the cladding. The refractive index of the cladding will be equal to $n_z$ in the core.

In accordance with the above described process steps a single mode polarizing form birefringent fiber may be formed to have the specifications given in table I below.

TABLE 1
POLARIZING FIBER SPECIFICATIONS

| | | |
|---|---|---|
| core composition | $f_1 = 0.800$ ($SiO_2$) | $f_2 = 0.200$ ($GeO_2$) |
| core indices | $n_z = 1.4781$ | $n_y = 1.4821$ |
| cladding composition | 82.28 mol % $SiO_2$ | 17.72 mol % $GeO_2$ |
| cladding index | 1.4781 | |
| core diameter | 2.8μ | |
| V number | 1.1673 | |

The V number of a fiber is $$V = k\rho(n^2_{core} - n^2_{cladding})^{\frac{1}{2}} \quad (28)$$

where $k = 2\pi/\lambda_0$ is the wave number, with $\lambda_0$ being the optical wavelength in vacuum, and $\rho$ is the radius of the fiber core. The V number is the criterion for determining whether a fiber will propagate a single mode or a multiplicity of modes of a signal of a given wavelength. If the V number is less than 2.405, then the fiber will be a single mode fiber. Lower V numbers increase the evanescent field of a light wave guided by the fiber relative to the portion of the wave propagating within the core. The core has the heavier $GeO_2$ doping than the cladding; and since the $GeO_2$ is the primary scattering agent in the fiber, reducing the portion of the field in the core reduces scattering. Therefore, the polarizing fiber is designed to have a relatively low V number.

All information carried by any optical fiber is transported by the propagation of light. Through several mechanisms, part of the guided by the core 16 escapes. If the escaped light is not suppressed, it will propagate along the fiber 15 as cladding modes. Cladding modes are uncorrelated to the information contained in the light guided by the core 16 and are considered to be noise. Over the length of the fiber 15 a portion of the cladding modes tend to couple back into the core 16 and compromise the integrity of the information in the light guided by the core. If the output of the fiber 15 is incident upon a detector (not shown), the detector will respond to both the light guided by the core 16 and the noise carried in the cladding modes.

Conventional single mode and multimode fibers, such as the fiber 30 of FIG. 5, are jacketed with a soft plastic material 58 to protect the fragile glass fiber 30 from breakage caused by mechanical stress. This coating is ordinarily transparent or translucent and has a refractive index greater than the refractive index of the cladding 34 of the fiber 30. The relation between the refractive indices of the cladding 34 and the jacket material 58 allows radiation modes to be stripped from the cladding 34. In most cases of conventional jackets, tens of meters of length of the fiber 30 are required for the mode stripping to be effective.

Referring to FIG. 4, It has been found that the effectiveness of the polarizing fiber 15 in propagating only a single polarization regardless of the polarization of the signal input thereto is enhanced by rapid attenuation of the radiation modes. Since the mechanisms that produce noise in the fiber are distributed along the length of the fiber, the noise should be suppressed in the minimum possible length to minimize the deleterious effects of noise on signal integrity. Therefore, in order to increase the signal/noise ratio of the fiber 15, an absorbing jacket 60 may be added around the cladding 24 as shown in FIG. 4. The absorbing jacket 60 comprises an opaque substance, such as finely divided carbon black in a high index plastic matrix in order to absorb the cladding modes within distances of a few millimeters along the length of the polarizing fiber 15.

Although the absorbing jacket of the present invention has been shown and described in connection with a polarizing form birefringent fiber, the jacket may be used with other optical fibers wherein absorption of the cladding modes is desirable.

What is claimed is:

1. A polarizing fiber optic waveguide, comprising:
   a core formed of a fiber optic material for propagating optical signals, said core including a plurality of layers of fiber optic material, said core being formed to have a first core refractive index $n_z$ for light polarized along a first axis and a second core refractive index $n_y$ for light polarized along a second axis perpendicular to the first axis;
   a cladding surrounding said core, said cladding being formed to have a cladding refractive index $n_{clad}$ at least as large as said first core refractive index $n_z$ and less than second core refractive index $n_y$, the relative magnitudes of the refractive indices $n_y$, $n_y$ and $n_{clad}$ cooperating to retain light waves polarized along the first axis in the cladding and to radiate from the core into the cladding light waves polarized along the second axis; and
   a jacket surrounding said cladding, said jacket being formed of a material which absorbs light propagating in said cladding such that said jacket absorbs light polarized along the second axis after it has radiated from said core into said cladding.

2. The form birefringent fiber optic waveguide of claim 1 wherein said core is comprised of a plurality of motifs fused together to form a monolithic structure, each motif including a plurality of layers of at least two different dielectric materials having different indices of refraction.

3. The form birefringent fiber optic waveguide of claim 2 wherein said core is formed of alternating layers of $SiO_2$ and $GeO_2$.

4. The form birefringent fiber optic waveguide of claim 1 wherein said core is formed of alternating layers of $SiO_2$ and $GeO_2$.

* * * * *